United States Patent [19]

Schmidt

[11] Patent Number: 5,420,469
[45] Date of Patent: May 30, 1995

[54] BRUSH AIR SEAL

[75] Inventor: Thomas A. Schmidt, Eden Prairie, Minn.

[73] Assignee: Onan Corporation, Minneapolis, Minn.

[21] Appl. No.: 142,239

[22] Filed: Oct. 25, 1993

[51] Int. Cl.⁶ .......................... H02K 9/26; H02K 9/00; F02B 77/14; F16J 15/48
[52] U.S. Cl. ........................................ 310/53; 310/88; 310/113; 123/198 E; 277/55
[58] Field of Search ...................... 310/53, 56, 88, 112, 310/113; 123/198 E, 41.7; 277/53, 55; 415/174.2, 174.5, 173.5

[56] References Cited

U.S. PATENT DOCUMENTS

| | | | |
|---|---|---|---|
| 2,451,903 | 10/1948 | Bauman | 310/53 |
| 3,731,121 | 5/1973 | Cook et al. | 310/227 |
| 3,761,748 | 9/1973 | Baumann et al. | 310/58 |
| 4,209,268 | 6/1980 | Fujiwara et al. | 277/53 |
| 4,716,683 | 1/1988 | Minter | 49/479.1 |
| 4,779,904 | 10/1988 | Rich | 277/53 |
| 5,066,024 | 11/1991 | Reisinger et al. | 277/53 |
| 5,084,641 | 1/1992 | Saima et al. | 310/51 |
| 5,177,385 | 1/1993 | Cooper et al. | 310/53 |
| 5,214,324 | 5/1993 | Holmes | 310/52 |
| 5,265,412 | 11/1993 | Bagepalli et al. | 277/53 |

FOREIGN PATENT DOCUMENTS

| | | | |
|---|---|---|---|
| 44376 | 1/1982 | European Pat. Off. | 312/229 |
| 3514382 | 6/1986 | Germany | 277/53 |
| 1523768 | 11/1989 | U.S.S.R. | 277/53 |

OTHER PUBLICATIONS

Brochure entitled: Memtech Nylon Brush Seals, Livonia, Mich. 48150, 4 pages, (published before filing date of Oct. 25, 1993), Date Oct. 1993.

*Primary Examiner*—Thomas M. Dougherty
*Assistant Examiner*—Clayton E. LaBalle
*Attorney, Agent, or Firm*—Merchant, Gould, Smith, Edell, Welter & Schmidt

[57] ABSTRACT

A generator engine set includes a brush partition for separating a space defined between an air blower housing and an enclosure into two areas so that an air flow from one area to the other area is substantially prohibited. The brush partition includes a flexible bristle portion and a rigid spline portion. The spline portion is retained in a receiving member on an outer surface of the air blower housing by a clip. The bristle portion extends toward the enclosure and engages an inner surface of the enclosure. Accordingly, a warmed air flow is prohibited from recirculating back into cooling air inlets.

18 Claims, 5 Drawing Sheets

BRUSH AIR SEAL

FIELD OF THE INVENTION

The present invention relates to an apparatus and method for obstructing heated air flow into the cooling air of an air cooled electromechanical system, such as a generator engine set, etc.

BACKGROUND OF THE INVENTION

An enclosure is usually used to reduce the vibration, noise, and harshness which are created by a generator engine set or other vibrating electromechanical systems. However, the enclosure creates a hot air recirculating problem in an air cooled system. Since the generator and engine are enclosed in the enclosure, air which is warmed, after passing by and/or through the generator and engine, has a tendency to be recirculated back into the cooling air inlet end of the enclosure where it is combined with the cooling air. It is not uncommon to have the air warmed to a temperature of 200 degrees Fahrenheit. This reduces the efficiency of the cooling system.

Some patents, such as U.S. Pat. No. 3,731,121 teach the use of baffles to redirect the hot air flow within the generator. Some other patents, such as U.S. Pat. No. 5,177,385, teach the use of an air gap baffle assembly to ensure that a coolant gas is circulated through a generator stator and rotor prior to flow through an air gap between the rotor and the stator.

Some previous designs of generator engine sets use a rubber molded member which is attached to an air blower housing of the cooling fan and is disposed in the space between the enclosure and the air blower housing. The rubber molded member forms a partition or obstruction inhibiting heated or warm air flow back to the cooling air inlets of the cooling fan. However, it is difficult to secure the rubber molded member on the air blower housing. Adhesive is usually used to secure the rubber molded member to the air blower housing. After about a few hundred hours of generator running time, the adhesive tends to break down because of hot ambient temperatures and system vibrations. Another problem of using the rubber molded member is that the rubber molded member is subject to wear because of the friction caused by vibration of the generator engine set. Thus, the hot air cannot be effectively prevented from recirculating to the cool air inlets. Another disadvantage with the use of a rubber molded member is that the vibrations of the generator engine set are easily transferred to the enclosure through the rubber molded member. Still another disadvantage with the use of a molded member is the difficulty in getting the molded rubber member to follow the various surface contours that are typically present so as to provide an effective barrier or seal preventing the mixing of the warmed air with the cooling air.

The present invention solves these and other problems.

SUMMARY OF THE INVENTION

The present invention relates to an apparatus and method for obstructing heated air flow into the cooling air of an air cooled electromechanical system, such as a generator engine set, etc.

In one embodiment, a brush partition is disposed in the space between the enclosure and air blower housing. The brush partition easily adapts to the various contours of the surrounding generator engine confines to achieve an effective isolation of the heated air from the cooling air while maintaining flexibility so as not to transmit excessive vibrations.

In one embodiment, recirculation of heated air from the heated air end of the enclosure back to the ambient cooling air end of the enclosure is sufficiently restricted so that during use ambient air in the ambient cooling air end of the enclosure is only increased 5 to 10 degrees Fahrenheit over the ambient air on the outside of the enclosure and at most, warmed 20 degrees Fahrenheit.

In one embodiment, a spline portion of the brush partition is snapped into clip members or other types of fasteners disposed on the air blower housing. Accordingly, the brush partition is mounted on the air blower housing which moves with the generator engine set. The bristle portion of the brush partition extends toward the enclosure such that the bristle portion engages an inner surface of the enclosure. The brush partition is not readily worn away by the relative movement between the generator engine and the enclosure. Moreover, the brush partition effectively prevents the hot air from combining with the cool air at the cool air inlets of the air blower housing.

Still in one embodiment, the brush partition comprises a plurality of bristles looping around an elongated member so as to form multiple layers of overlapping bristles. The looped bristles and the elongated member are retained in a channel member so as to form a spline portion of the brush partition. The channel member retaining the overlapped layered bristles and the elongated member is bent so as to form a brush segment which has two side portions interconnected by a back portion, such as a U shape, and is snapped into the fasteners disposed on the air blower housing. In one embodiment, two or more such segments are preferably used to form an entire brush partition which separates the cooling air inlet end of the enclosure from the warm end of the enclosure. This is accomplished by abutting the brush segments end for end to form a continuous brush partition. Accordingly, the warm air circulation back to the cold air inlet end of the enclosure is largely prohibited.

In alternative embodiments, a single, continuous brush segment might be used.

Further in one embodiment, a length of an exposed portion of each of the bristles is longer than a width of the space between the air blower housing and the enclosure so that the bristles are bent along an inner surface of the enclosure. Thus, the overlapped bristles provide a good sealing function between the enclosure and the air blower housing. In addition, at a corner of the enclosure, the bristles are preferably long enough to engage with the enclosure at the corners of the enclosure and at other areas where the spacing is greater and/or equivalent configuration.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters generally indicate corresponding parts throughout the several views.

DETAILED DESCRIPTION OF THE PREFERRED EMBODIMENT

Figure 1:
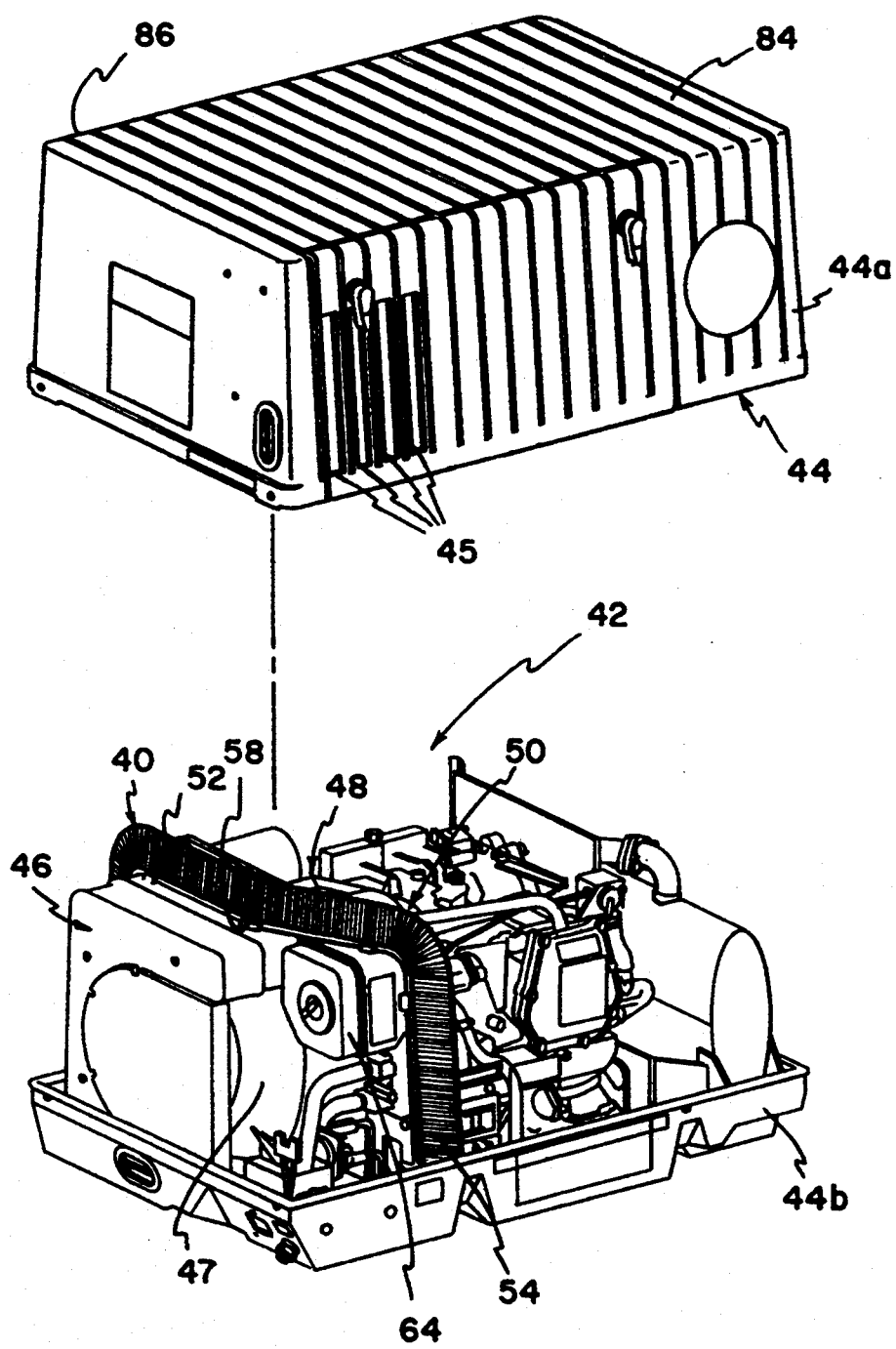
FIG. 1 is a perspective view of an embodiment of a brush partition used in a generator engine set in accordance with the principles of the present invention, an enclosure of the generator engine set being removed to expose the generator engine set.

Referring now to the drawings in detail, wherein like numerals identify similar elements throughout, FIG. 1 shows a perspective view of an embodiment of a brush partition 40 used in an air cooled generator engine set 42 in accordance with the principles of the present invention. An enclosure 44, normally enclosing the engine generator set 42, is removed for purposes of illustration.

An air blower housing 46 is disposed on the generator engine set 42. A cooling fan (not shown) housed in the air blower housing 46 draws ambient air from outside the enclosure 44 through cooling air inlets 45 disposed on the enclosure 44 and through air inlets 47 on the air blower housing 46 into a generator 48 and an engine 50 so as to cool the generator engine set 42. The heat generated by the generator engine set 42, especially that generated by the engine 50, quickly warms the ambient air flow as the air flows past and through the generator 48 and the engine 50. Because the cooling fan draws the ambient air from outside the enclosure 44, the air pressure on the warm air side of the enclosed space 56a is greater than the air pressure on the cold air side of the enclosed space 56b. As a result, the warmed air has a tendency to be recirculated back into the cooling air inlets 47 of the air blower housing 46 wherein it is combined with the cooling air. If this recirculation is allowed to occur, it dramatically reduces the efficiency of the air cooling system. Test results show that without any restriction of this recirculation, the temperature of the cooling air flow rises very quickly.

To prevent the warmed air from recirculating back into the cooling air inlets 47, the brush partition 40 is used to separate or partition the space between the enclosure 44 and the engine generator set 42 such that warm air flow back to the air inlets 47 is obstructed or prohibited. The brush partition 40 functions as an air seal restricting mixture of the heated air with the fresh incoming cooling ambient air. The preferred embodiment of the brush partition 40 includes two segments 52, 54. Two ends of the segments 52, 54 abut with each other end for end to form the brush partition 40. It will be appreciated that more than two segments might be used or that a single segment might be used.

In one embodiment, the length of the brush partition 40 is about 20 inches, and the width of the brush partition 40 is about 14 inches. The brush partition 40 is disposed in a space defined between the enclosure 44 and the generator engine set 42. Warmed air is generally located on one side of the brush partition in the space 56a, and ambient cooling air is located on the other side of the brush partition in the space 56b (see FIGS. 6 or 7). The brush segments 52, 54 are respectively bent into certain shapes to fit the contour of an outer surface 60 of the air blower housing 46. Thus, the warm air which would normally tend to recirculate back to the cold air side is obstructed by the brush partition 40.

A plurality of clip members 58 are molded integral with the outer surface 60 of the air blower housing 46. The clip members 58 might also be attached to the housing by other methods. The clip members 58 receive and retain the brush segments 52, 54 on the outer surface 60 of the air blower housing 46. It will be appreciated that other methods might be used to fasten the brush segments 52, 54 to the air blower housing 46, e.g. adhesives, fasteners, tape, etc. In alternative embodiments, the brush 40 might be fastened to the enclosure. In yet other embodiments, some segments might be attached to the enclosure and some segments to various vibrating components of the generator engine set 42.

In the preferred embodiment, the clip members 58 are oriented toward the warm air space 56a. The angle or orientation is preferably 7.5°. The oblique angle can be changed according to various dimensional requirements. Accordingly, the brush partition 40 which follows the direction of the clip members 58, is obliquely oriented toward the warm air side. The orientation of the brush partition 40 facilitates the formation of an effective barrier. As the air from the heated air space 56a forces against the barrier 40, the brush is forced into the surface of the enclosure to form a more effective seal.

The enclosure 44 which encloses the generator 48, the engine 50, the air blower housing 46, the brush partition 40, etc. includes a top portion 44a and a bottom portion 44b.

Figure 2:
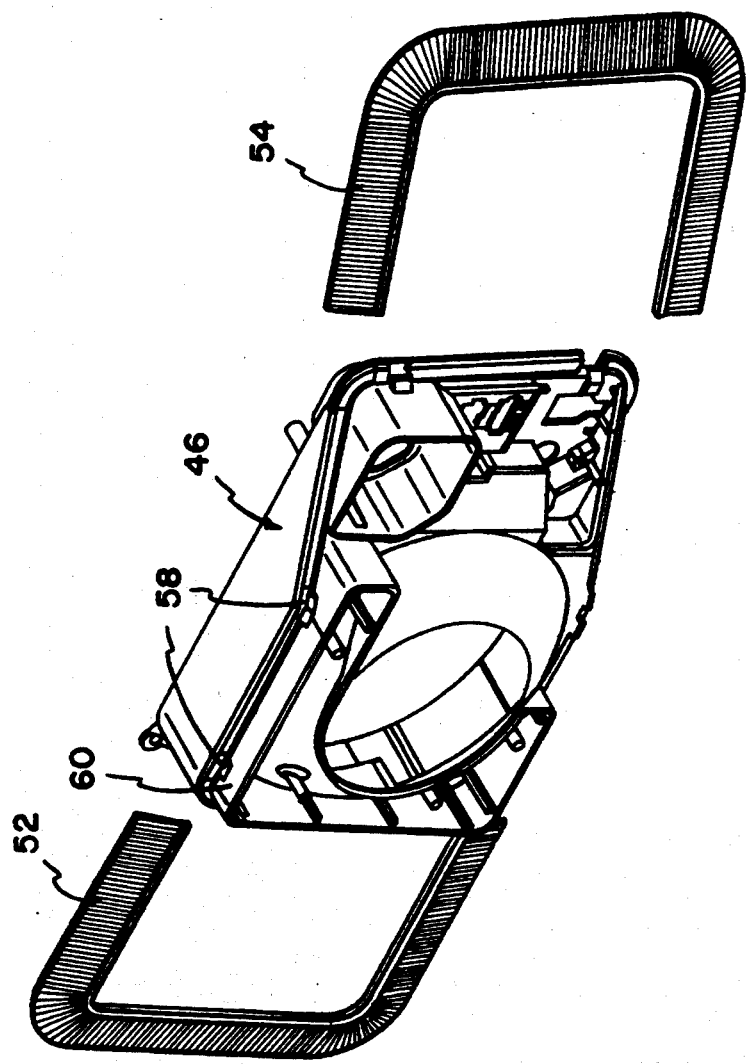
FIG. 2 is an exploded perspective view of an air blower housing and the brush partition.

FIG. 2 shows an exploded view of the two U shape brush segments 52, 54 and the air blower housing 46. The brush 52 is disposed on a part of the air blower housing 46 which encloses blades of an air fan (not shown). The brush 54 is disposed on the part of the air blower housing 46 which encloses an air filter 64, etc.

The air blower housing 46 and the clip members 58 are preferably made of a molded plastic material.

Figure 3:
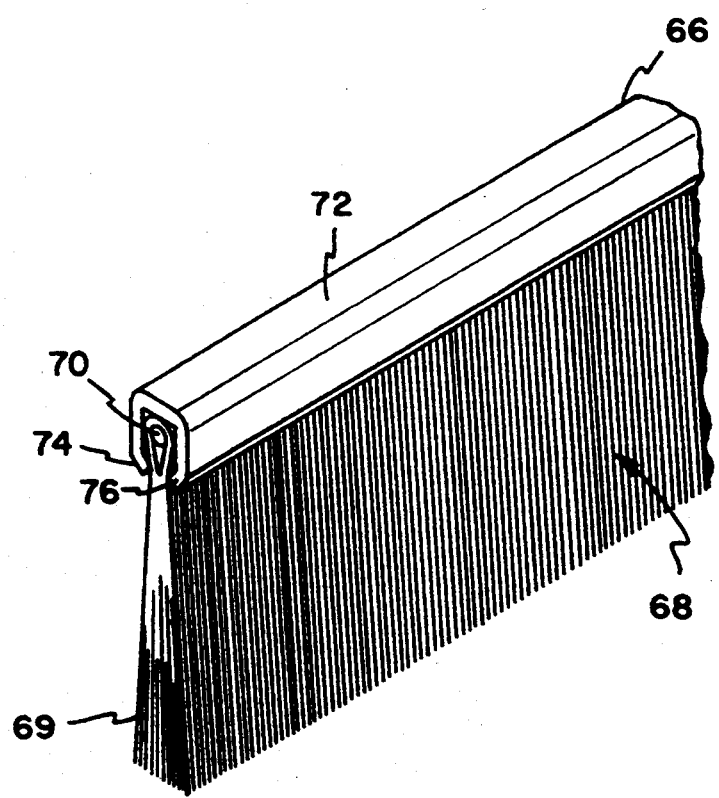
FIG. 3 is an enlarged perspective view of the brush partition.

The structure of the brush partition 40 is shown in FIG. 3. The brush partition 40 includes a rigid spline portion 66 and a flexible bristle portion 68 including a plurality of flexible bristles 69 arranged in multiple overlapping layers. The spline portion 66 is retained or snapped into the clip members 58 to provide an interference fit therewith.

The plurality of bristles 69 of the bristle portion 68 loop around an elongated rod 70. The elongated rod 70 and the looped bristles 69 are retained into a channel member 72 of the spline portion 66. The channel member 72 has two flanges 74, 76 at the opening of the channel member 72. The flanges 74, 76 retain the elongated rod 70 and the looped bristles 69 in the channel member 72.

In one embodiment, the bristles 69 of the brush partition 40 are made of nylon which has a good chemical resistance to chemical pollution in the generator engine set 42. The elongated rod 70 and the channel member 72 are preferably made of steel. It will be appreciated that the brush partition might take on varying configurations and yet be in keeping with the principle of the invention.

The diameter of the bristles 69 in one embodiment is 0.008 inches. There are multiple layers of bristles so that the bristles 69 are overlapped. In addition, the bristles 69 at both ends of both the brush segments 52, 54 are configured and arranged such that the bristles 69 on the ends of the abutting segments 52, 54 overlap thereby providing a continuous brush partition 40. Thus, a continuous brush partition 40 is formed.

In one embodiment, the width of the bristle portion 68 from the spline to the tips of the bristles is 1.75 inches. The width of the space 56 in many locations is about 1.25 inches, which is 0.5 inches shorter than the length of the bristle portion 68. Accordingly, the tip of the bristle portion 68 is bent and disposed along the inner surface 62 of the enclosure 44. Since the brush partition 40 is obliquely oriented at an angle of 7.5° toward the warm air space 56a, only about 0.3 inches length of the bristles 69 is disposed along the inner surface 62 of the enclosure 44 when the width of the space is 1.25 inches. Preferably, the brush partition 40 is wide enough to continuously engage the surface of the enclosure 44 despite any contours in the surface and/or variations in the width of the space spanned by the brush partition 40. In some embodiments, the width of the brush partition might vary. For example, brush segments having different widths might be used. Accordingly, a continuous partition is formed between the enclosure 44 and the air blower housing 46. Even under dynamic conditions, such as when the engine is running and the air blower housing 46 is shaking, the bristles 69 are brushing along the inner surface 62 of the enclosure 44. Further, no vibration is transferred from the air blower housing 46 to the enclosure 44 through the brush partition 40. In addition, there is little wear of the bristles in the bristle portion 68.

Figure 4:
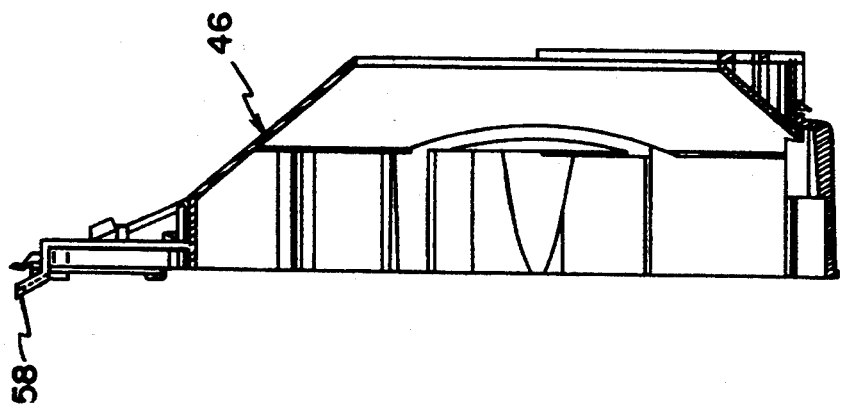
FIG. 4 is an elevated side view of the air blower housing with a clip member disposed on the air blower housing.

FIG. 4 further shows a side view of the clip member 58 which is integrally molded with the outer surface 60 of the air blower housing 46.

Figure 5:
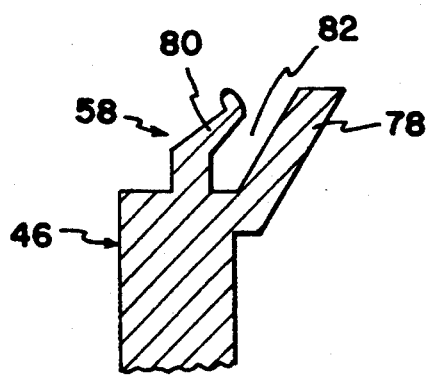
FIG. 5 is an enlarged elevated side view of the clip member on an outer surface of the air blower housing.

FIG. 5 shows an enlarged view of the clip member 58 integrally molded with the outer surface 60 of the air blower housing 46. The clip member 58 includes two sides 78, 80 facing each other with side 80 being more resilient than side 78. The spline portion 66 slides into a space 82 defined between the sides 78, 80 so as to provide an interference fit. The sides 78, 82 are bent at about 7.5 degrees toward the warm air side or space 56a. The connection between the sides 80 and 82 is a part of the outer surface 62 of the air blower housing 46. Accordingly, the spline portion 66 of the brush partition 40 abuts the outer surface 60 of the air blower housing 46.

Figure 6:
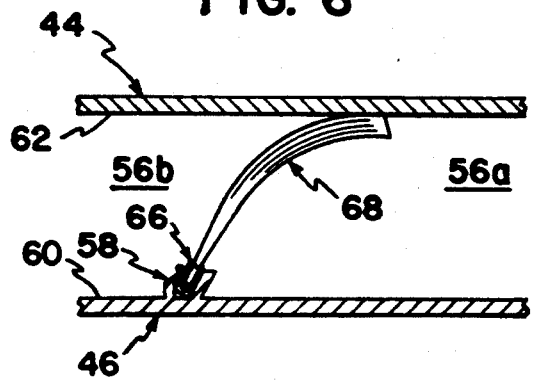
FIG. 6 is an enlarged cross-sectional view of the brush partition being disposed in a space defined between the enclosure and the air blower housing.

In FIG. 6, a cross-sectional view shows that the brush partition 40 is disposed in the space 56 between the inner surface 62 of the enclosure 44 and the outer surface 60 of the air blower housing 46. The spline member 66 is locked into the clip member 58, and the tip of the bristle portion 68 is bent along the inner surface 62 of the enclosure 44.

Figure 7:
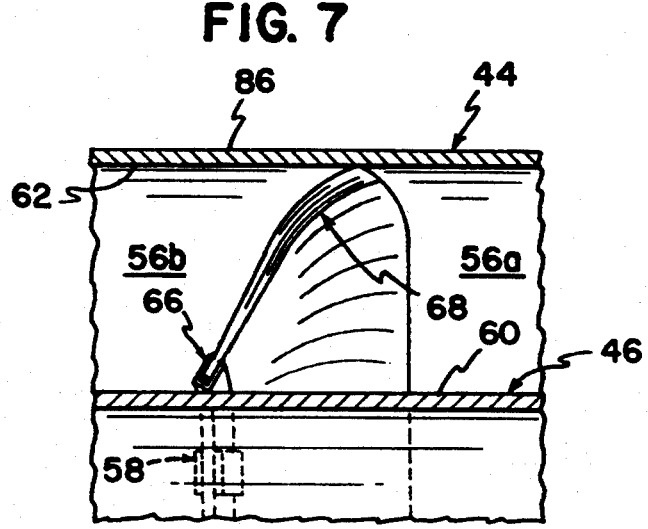
FIG. 7 is an enlarged cross-sectional view of the brush partition being disposed in the space proximate a corner of the enclosure.

FIG. 7 is a cross-sectional view at a 45 degree angle along a side 84 at a corner 86 of the enclosure 44 (see FIG. 1). The bristles 69 spread out toward a curved inner corner surface of the enclosure 42 so as to follow the contour of the inner surface 62 of the enclosure 44. Even though the bristles 69 are spread out, the multiple layers of the bristles 69 are still overlapping to prevent the warmed air flow from recirculating back to the air cooling inlets 47. In addition, the bristle portion 68 is long enough to engage the corners of the enclosure 44. In one embodiment, about 0.2 inches length of the bristles 69 is bent along the inner surface 62 of the enclosure 44 at the corner. Thus, the brush partition 40 is continuous even though a greater extent of surface is engaged by the bristle portion 68 than the spline portion 66.

Figure 8:
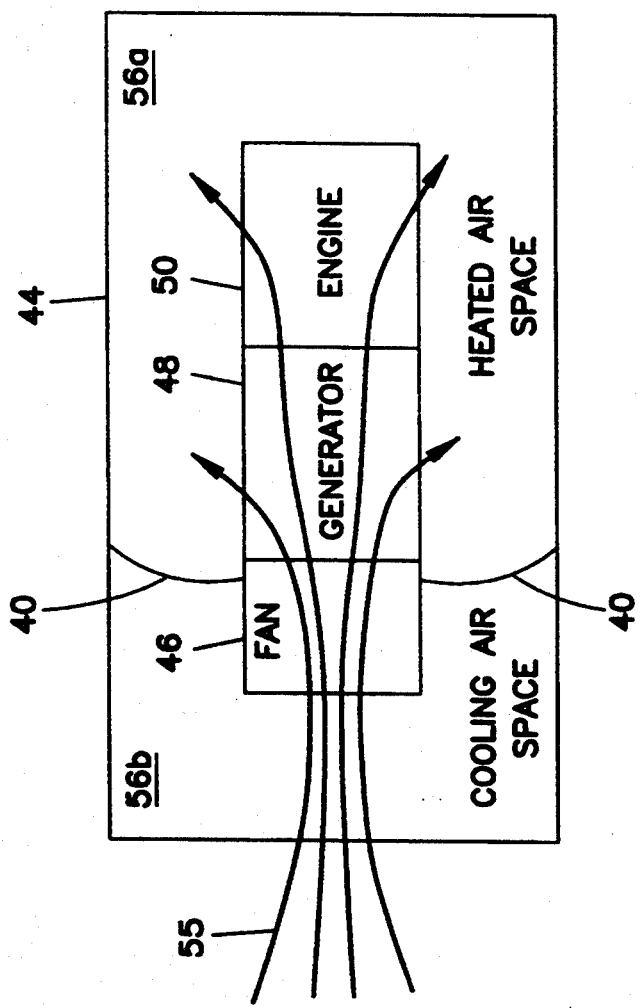
FIG. 8 is a diagrammatic view of a generator engine set in accordance with the principles of the present invention.

FIG. 8 is a diagrammatic view illustrating the generator engine set within the enclosure 44. The brush partition 40 is shown separating the space between the generator engine set and the enclosure 44 into a heated air space 56a and a cooling air space 56b.

In assembling the brush partition 40 in the space between the enclosure 44 and the air blower housing 46, firstly, the top portion 44a of enclosure 44 is removed. Next, the spline portion 66 of two brush segments 52, 54 is snapped into the clip members 58 on the air blower housing 46 so that the bristle portion 68 is obliquely oriented toward the warm air side 56a. Then, cover the top portion 44a is placed over the bottom portion 44b of the enclosure 44 whereupon the bristle portion 68 engages with the inner surface 62 of the enclosure 44. A tight, continuous partition is thus formed to prevent the warm air from recirculating back to the cooling air inlets on the cold air side.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A generator/engine set including a generator and an engine enclosed by an enclosure, the generator/engine set further comprising:
   a space separating the generator/engine from the enclosure; and
   brush means for separating the space between the generator/engine and the enclosure into two areas so that the air flow from one area to the other is substantially prohibited whereby a temperature differential is maintained between the two areas.

2. A generator/engine set in accordance with claim 1, wherein the brush means comprises:
   a brush having a spline portion and a bristle portion;
   means for attaching the spline portion of the brush on an outer surface of the generator/engine; and
   the bristle portion extending into the space defined between the generator/engine and the enclosure, and engaging an inner surface of the enclosure.

3. A generator/engine set in accordance with claim 2, wherein the brush includes at least two portions abutting ends so as to surround the outer surface of the generator/engine.

4. A generator/engine set in accordance with claim 2, wherein the bristles of the bristle portion loop around an elongated member, and the spline portion further comprising means for retaining the bristles about the elongated member.

5. A generator/engine set in accordance with claim 2, wherein the attaching means is integrally molded with the outer surface of the generator/engine.

6. A generator/engine set in accordance with claim 5, wherein the clip means is obliquely oriented, the brush in the attaching means being similarly oriented.

7. A generator/engine set in accordance with claim 2, wherein the attaching means includes clip means for retaining the spline portion of the brush, a space defined in the clip means receiving the spline portion of the brush in an interference fit.

8. A generator/engine set in accordance with claim 2, wherein the bristle portion is bent by engagement with the inner surface of the enclosure such that the bristle portion engages the inner surface along a longitudinal extent of the bristle portion.

9. A generator/engine set in accordance with claim 2, wherein a length of the bristle portion is not less than the space, which is defined between the generator/engine and the enclosure, at a corner of the enclosure.

10. A generator/engine set in accordance with claim 2, wherein the bristles of the bristle portion are formed in multiple layers, the bristles being overlapped.

11. A method for obstructing an air flow in a space defined between a generator/engine and an enclosure which encloses the generator/engine, comprising the steps of: providing a brush having a spline portion and a bristle portion; providing a plurality of recesses on an outer surface of the generator/engine for receiving the spline portion of the brush;

retaining the spline portion of the brush in the recesses; and enclosing the generator/engine with the enclosure such that the bristle portion of the brush engages with an inner surface of the enclosure so as to form an obstruction separating the space surrounding the generator/engine into two areas so that the air flow from one area to the other is prohibited by the brush.

12. A generator/engine set including a generator and an engine enclosed by an enclosure, the generator/engine set comprising:

a space separating the generator/engine from the enclosure; and a brush separating the space between the generator/engine and the enclosure into two areas so that the air flow from one area to the other is substantially prohibited.

13. A generator/engine set in accordance with claim 12, wherein the brush includes a spline portion and a bristle portion, the generator/engine set further comprises a plurality of recesses for receiving the spline portion of the brush on an outer surface of the generator/engine, the bristle portion extending into the space defined between the generator/engine and the enclosure and engaging an inner surface of the enclosure.

14. A generator/engine set in accordance with claim 13, wherein each of the recesses has a clip portion, so that the spline portion is retained in the recesses.

15. An engine assembly including an engine enclosed by an enclosure, the engine assembly further comprising:

a space separating the engine from the enclosure; and brush means for separating the space between the engine and the enclosure into two areas so that the air flow from one area to the other is substantially prohibited whereby a temperature differential is maintained between the two areas.

16. An engine assembly in accordance with claim 15, wherein the brush means comprises:

a brush having a spline portion and a bristle portion;

means for attaching the spline portion of the brush on an outer surface of the engine; and the bristle portion extending into the space defined between the engine and the enclosure, and engaging an inner surface of the enclosure.

17. A generator set including a generator enclosed by an enclosure, the generator set further comprising:

a space separating the generator from the enclosure; and brush means for separating the space between the generator and the enclosure into two areas so that the air flow from one area to the other is substantially prohibited whereby a temperature differential is maintained between the two areas.

18. A generator set in accordance with claim 17, wherein the brush means comprises:

a brush having a spline portion and a bristle portion;

means for attaching the spline portion of the brush on an outer surface of the generator; and the bristle portion extending into the space defined between the generator and the enclosure, and engaging an inner surface of the enclosure.

* * * * *